(12) United States Patent
Elsner

(10) Patent No.: US 7,556,145 B2
(45) Date of Patent: Jul. 7, 2009

(54) GAPLESS SIDE GUARD

(75) Inventor: Dietmar Elsner, Eimeldingen (DE)

(73) Assignee: Habasit AG, Reinach (CH)

( * ) Notice: Subject to any disclaimer, the term of this patent is extended or adjusted under 35 U.S.C. 154(b) by 0 days.

(21) Appl. No.: 11/635,991

(22) Filed: Dec. 8, 2006

(65) Prior Publication Data

US 2008/0135383 A1 Jun. 12, 2008

(51) Int. Cl.
*B65G 17/06* (2006.01)
(52) U.S. Cl. .................. 198/850; 198/778
(58) Field of Classification Search ......... 198/850–853, 198/778
See application file for complete search history.

(56) References Cited

U.S. PATENT DOCUMENTS

| 2,091,213 | A | | 8/1937 | Pink |
| 4,991,710 | A | * | 2/1991 | Imatomi ............... 198/822 |
| 5,137,144 | A | * | 8/1992 | Uehara ............... 198/851 |
| 6,237,750 | B1 | * | 5/2001 | Damkjaer et al. ............ 198/778 |
| 6,695,128 | B2 | * | 2/2004 | Palmaer et al. ............ 198/778 |
| 6,766,901 | B2 | | 7/2004 | Guldenfels et al. |
| 6,811,021 | B1 | * | 11/2004 | Corley ............... 198/853 |
| 6,840,371 | B2 | * | 1/2005 | Hansen et al. ............ 198/850 |
| 7,258,226 | B2 | * | 8/2007 | Nelson et al. ............ 198/778 |

FOREIGN PATENT DOCUMENTS

| DE | 2 207 886 | | 8/1973 |
| EP | 1 277 676 | A1 | 1/2003 |
| FR | 2 588 250 | | 4/1987 |
| WO | WO 01/98185 | A1 | 12/2001 |
| WO | WO 03/002433 | A1 | 1/2003 |

\* cited by examiner

*Primary Examiner*—James R Bidwell
(74) *Attorney, Agent, or Firm*—Hodgson Russ LLP

(57) ABSTRACT

A gapless side guard for use with a modular belt having modules connected to one another by pivot rods. The gapless side guard has a continuous strip of flexible material for retaining materials being transported on the modular belt. In one embodiment, the strip has strip openings and the strip is connected to the module with brackets. The brackets have anchors and the strip openings are positioned around the anchors such that the strip is thereafter joined to the anchors. The bracket has a stud side with studs extending from the stud side. The module has stud openings and the studs are snapped into the stud openings in the module and are thereafter joined to the module. The strip is flexible such that when the modular belt is driven over a sprocket it is capable of elongating as the distance between the brackets increases.

17 Claims, 13 Drawing Sheets

GAPLESS SIDE GUARD

BACKGROUND OF THE INVENTION

Modular belts have connected modules, and each module has a load side, opposed outer sides, and opposed link ends with link openings. The opposed link ends are intercalated and a pivot rod is positioned in the link openings to connect the modules. The modular belt thus has a load surface that is coplanar with the load sides of the modules. The load surface is for transporting materials. Modular belts may be assembled chain-like from modules extending over the full belt width or bricklayed with modules having different lengths. In addition, some modular belts have modules with spaced apart side guards (also referred to as side plates) that extend from the load sides of the modules proximal to the opposed outer sides of the modules. The side guards are for preventing the material being transported on the modular belt from falling off the modular belt load surface. The side guards are often used in combination with flights that extend laterally across the modular belt. Thus, the modular belt has compartments that are bounded by the load surface, one flight and the next flight, and the spaced apart side guards. The compartments are for engaging the material being transported on the modular belt.

The side guards usually have flat plates that are a little wider than the module pitch of the belt and therefore they overlap. The side guards may be joined to the modular belt with a snap fit, that is, the modules have openings and the side guards can be forced into the openings and to engage the module and lock in place. Other joining methods are also known. All of these arrangements are susceptible to instability between the side guards, such that gaps exist between the side guards. These gaps disadvantageously fill with residual materials which are difficult to remove, making the modular belt and side guards difficult to clean. Another problem associated with side guards is that the overlapping of the side guards is significantly reduced when the modular belt moves over a sprocket, which allows the material being transported to escape between the side guards. In addition, when the modular belt bends in on itself in a backbending situation, the side guards undesirably overlap one another. The above-described movements of the side guards undesirably reduce the stability of the modular belt and may damage the materials or goods being transported on the modular belt.

Thus, there is a need for a conveyor belt that eliminates the above-described problems and that is easy to clean.

SUMMARY OF THE INVENTION

The present invention meets the above described need by providing a gapless side guard that is flexible and prevents materials that are transported on a conveyor belt from falling off the conveyor belt. The gapless side guard has a flexible strip that is made of a plastic material and is connected to the modular belt with brackets that are joined to the modular belt. Each bracket has a convex side and an opposed concave side. An anchor having an enlarged head extends from the concave side. The strip has strip openings, and the strip is joined to the bracket by moving the strip openings over the enlarged heads of the anchors. After the strips are moved over the anchors, the anchors join the strip and brackets. The brackets have opposed elevated and stud sides, and studs extend from the stud sides. The studs have first contact surfaces, and the modules have stud openings. The studs are forced into the stud openings such that the first contact surfaces of the studs abut the module, thus joining the module and brackets. The studs could also be screwed or welded to the module. The gapless side guards are connected to the belt proximal to the outer ends of the rows of modules. There is also a method for making a gapless side guard comprising providing a modular belt, providing a strip and brackets and joining the strip to the brackets and joining the brackets to the modular belt.

In another embodiment, there is a gapless side guard comprising a modular belt having modules each having a base side and an opposed load side, an elevated base side opposite the load side, opposed outer first and outer second sides, and opposed first and second links having openings. Slots extend through the elevated base, and a hooked strip having an extension opening is positioned in the slots. The hooked strip is connected to the modular belt with a pivot rod that extends through the openings and the extension opening.

In another embodiment there is a gapless side guard comprising a modular belt having modules each having a base side and an opposed load side, an elevated base side opposite the load side, opposed outer first and second outer sides, and opposed first and second links having openings. The guard members extend from the load side of each module proximal each of the opposed outer first and second sides and wherein each of the guard members has a first interlock portion disposed at one end thereof and a second interlock portion disposed at the other end thereof such that the first interlock portions of the module are capable of interconnecting with the second interlock portions of an adjacent module.

BRIEF DESCRIPTION OF THE DRAWING FIGURES

A gapless side guard invention is illustrated throughout the drawing figures. The same reference number is used to call out the same or similar surfaces, structures or features throughout the drawing figures of the embodiments of the gapless side guard, wherein.

DESCRIPTION

Figure 8:
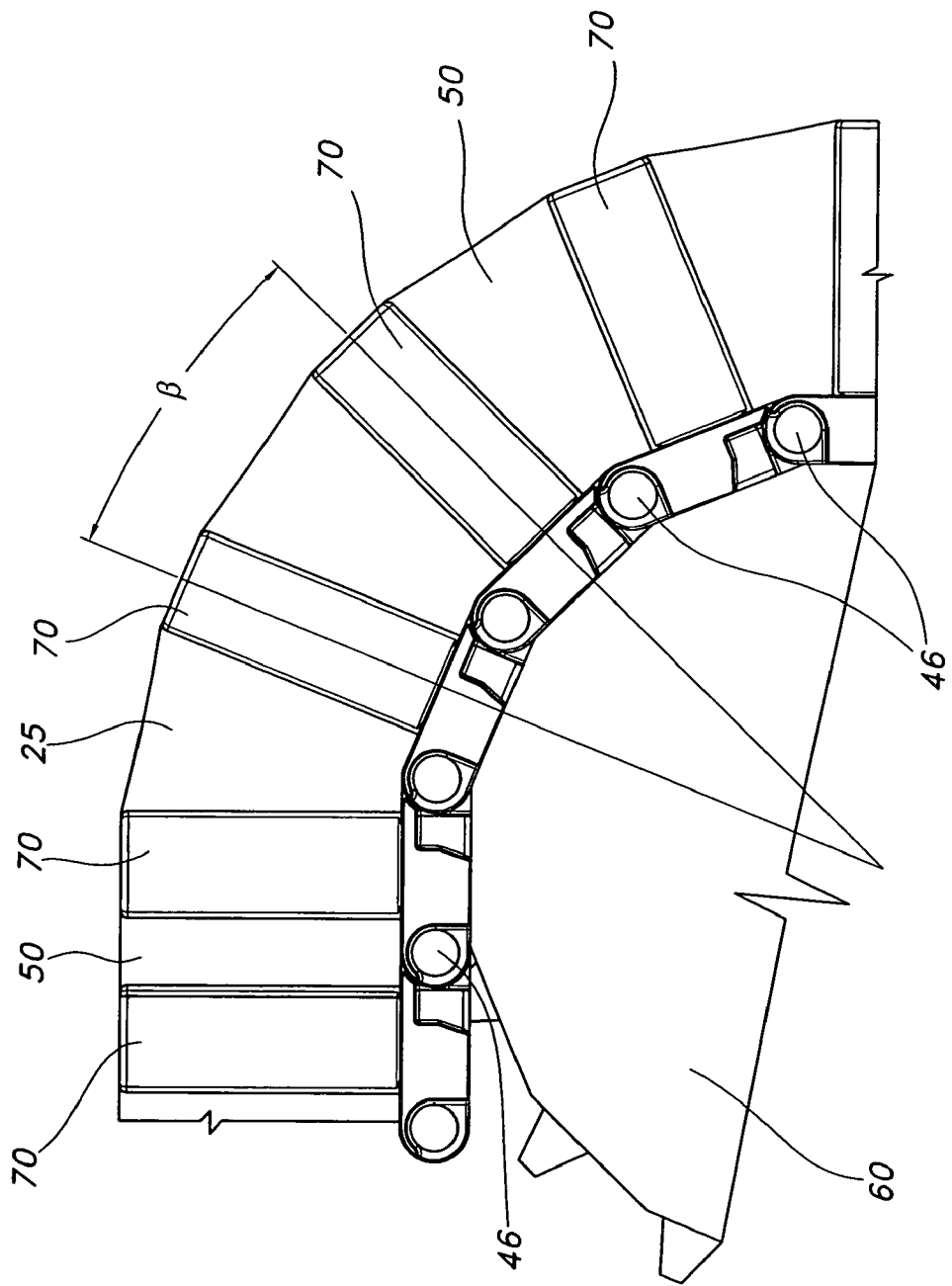
FIG. 8 is a front elevational view of the modular belt having a gapless side guard positioned around a sprocket.

FIGS. 1-6 and 8 and 9 show a section or portion of modular belt 20 that is comprised of modules 22. As shown in FIGS. 9C and 9D, the belt 20a may be constructed of rows of modules 22a extending from one side of the belt 20a to the other side of the belt 20a. The belt 20a has edge modules 22a with brackets 70 for supporting the strip 50. Center or middle modules 22b may be conventional without structure such as openings 120 or the like for supporting the strip 50. Edge modules 22a have different lengths such that the belt 20a has adjacent rows 23a, 23b, 23c, 23d, 23e, etc. that are arranged in bricklayed fashion as known to those of ordinary skill in the art.

Figure 1:
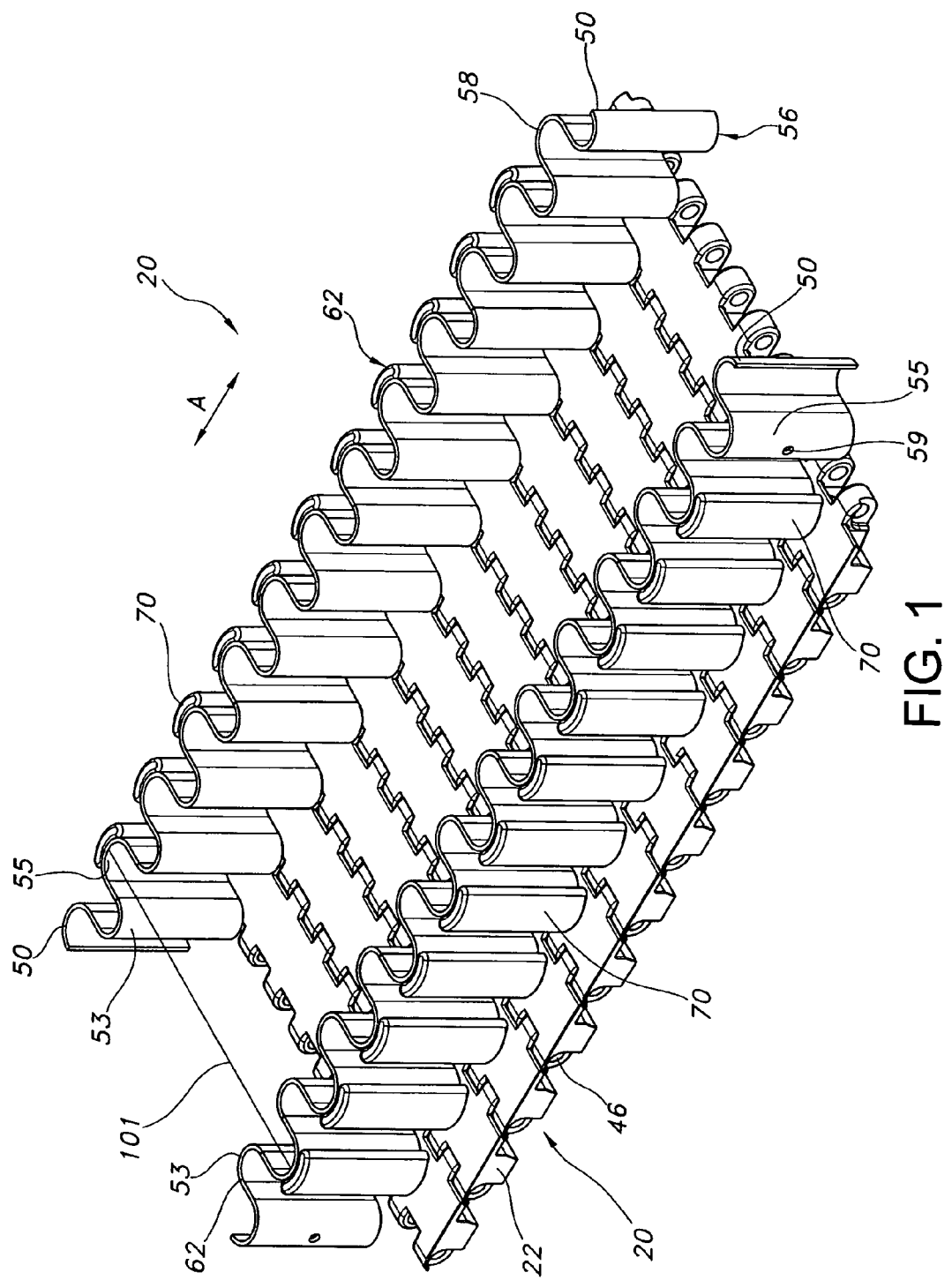
FIG. 1 is a perspective view of a section of modular belt having a gapless side guard.
Figure 2:
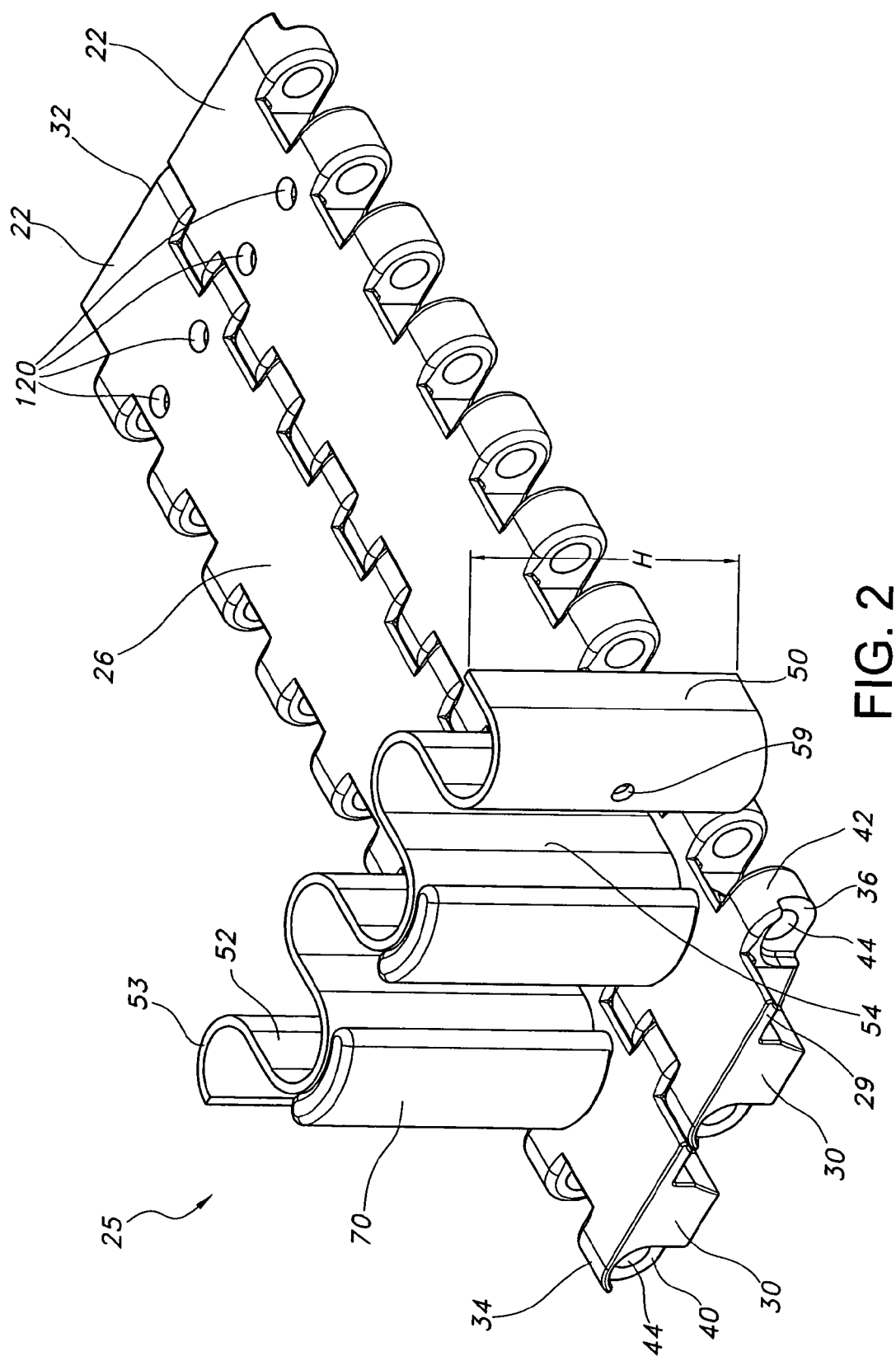
FIG. 2 is an enlarged perspective view of a pair of modules and the gapless side guard.

Alternatively as shown in FIG. 2, the belt 20 may be constructed like a chain with a single module 22 in each row extending from one side of the belt to the other side of the belt. A gapless side guard 25 is joined to the modular belt 20, as shown. The direction of travel of the modular belt 20 is indicated by arrow A in FIG. 1. Each of the modules 22 has a load side 26 and an opposed base side 28, an elevated base side 29, opposed outer first and second sides 30, 32, respectively, that extend from the load side 26 to the base side 28, as shown in FIG. 2. As shown in FIG. 2, each of the modules 22 has first and second link ends 34, 36, respectively, having offset first and second links 40, 42, respectively, with each having an opening commonly designated 44. The modules 22 are connected by intercalating the first link ends 34 and the second link ends 36 such that the openings 44 in each align, and positioning a pivot rod 46 in the aligned openings 44. The pivot rod 46 may be retained in the openings in many ways as is well known to those having ordinary skill in the art. The modules 22 comprise plastic. A modular belt 20 is thus formed in this manner and the modular belt 20 has a modular belt load surface 26.

The gapless side guard 25 includes strips, commonly designated 50 of continuous thin flexible material. The strip 50 is plastic and preferably endless. In one of the preferred embodiments the strip 50 has a film thickness, designated FT in FIG. 6, preferably about 1 to 3 millimeters, but could be greater or less than about 1 to 3 millimeters in other embodiments and applications. The strip 50 may comprise any flexible material, including flexible plastics such as polyurethane, polyvinylchloride, polypropylene, polyamide, combinations thereof and other suitable materials. In one of the preferred embodiments the strip 50 can have a height, designated H in FIG. 2, of about 50 millimeters, but in other embodiments the height H can be more or less than about 50 millimeters. The strip 50 could also be embodied with ends that are joined by an ultrasonic welding process or by adhesives.

As shown in FIGS. 1 and 2, the strip 50 has an inner strip wall 52 and an opposed outer strip wall 54. The inner strip wall 52 is for contacting material or product being transported on the modular belt 20. The strip 50 also has opposed first and second strip ends 56, 58, respectively. As shown in FIGS. 1 and 2, the first strip end 56 is proximal the load sides 26 of the modules 22 and abuts against the load sides 26. This advantageously prevents the material being transported from escaping, because there is little or no gap or space between the first strip end 56 and the load sides 26 of the modules 22, as shown in FIGS. 1 and 2.

The strip 50 can stretch and extend longitudinally and contract. Thus, the strip 50 has a wave shaped cross section that resembles a sinusoidal wave when compressed as indicated by reference number 62. This wave-like cross section exists when the strip 50 is compressed as it is moved along the flat portions of the modular belt 20. Thus, when compressed the strip 50 has a wavelength designated W in FIG. 5, and first and second crest portions 53, 55, respectively, that join with one another, and an amplitude designated A in FIG. 5. In addition, when the strip 50 is compressed portions of the inner strip wall 52 face one another, and portions of the outer strip wall 54 face one another, and the first strip end wall 56 contacts the modular belt load surface 21. As shown in FIG. 8 the strip 50 is capable of advantageously expanding such that an amplitude A of the wave W approaches zero as the modular belt 20 is driven over a sprocket 60. Driving a modular belt with a sprocket is well known to those having ordinary skill in the art.

Figure 3:
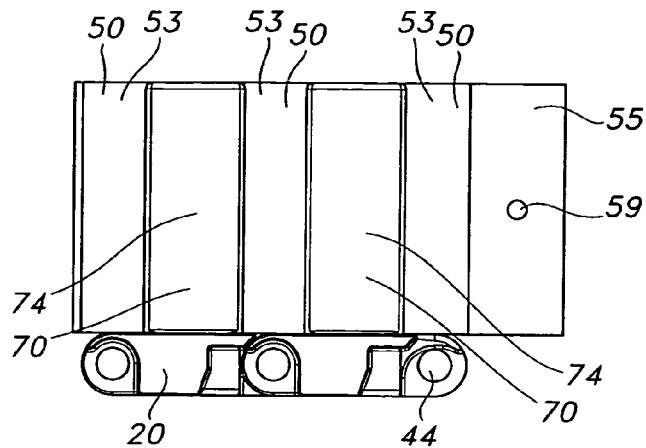
FIG. 3 is a front elevational view of a section of the modular belt having the gapless side guard.
Figure 4:
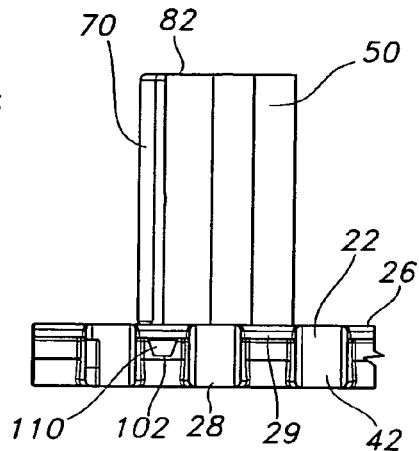
FIG. 4 is right side elevational view of the modular belt and gapless side guard.
Figure 5:
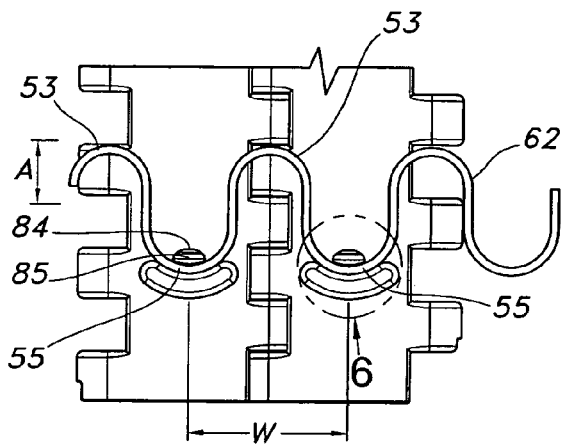
FIG. 5 is a top plan view of a section of the gapless modular belt.

As shown in FIGS. 1-8, brackets 70 connect the strip 50 to the modular belt 20. In particular, the strip 50 has strip openings 59 as shown in FIGS. 1-3. The strip openings 59 are in the second crest portions 55 that are spaced apart. The strip openings 59 extend from the outer strip wall 54, through the strip 50, to the inner strip wall 52.

Figure 6:
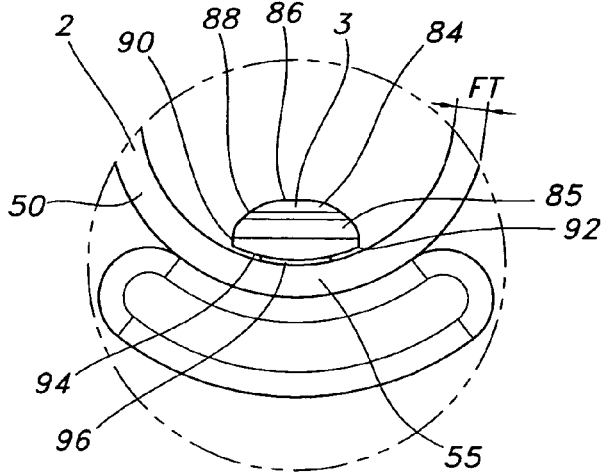
FIG. 6 is an enlarged top plan view of the gapless side guard and modular belt.
Figure 7:
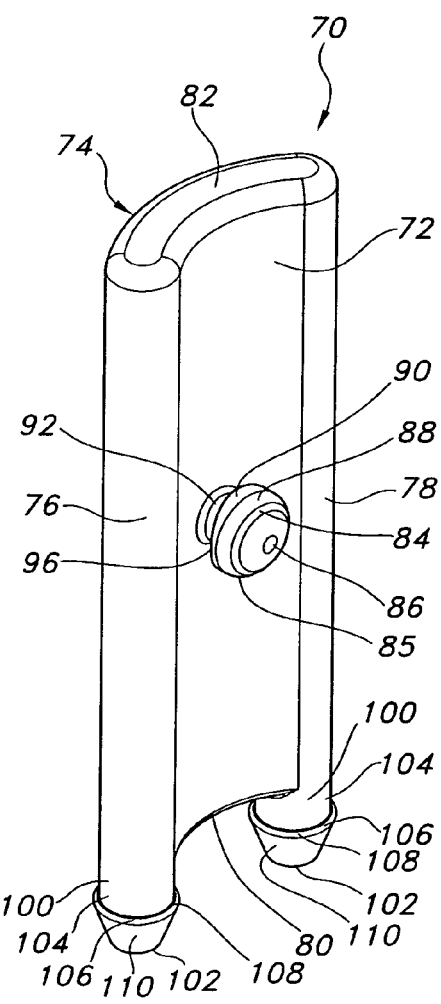
FIG. 7 is a perspective view of a bracket.

The strip 50 is connected to the modular belt 20 with brackets 70. As shown in FIG. 7, each bracket 70 has a concave side 72 and an opposed convex side 74, opposed first and second edges 76, 78, respectively, and a post or stud side 80 and an opposed elevated side 82. As shown in FIGS. 6 and 7, an anchor 84 extends from the concave side 72, and the anchor has an enlarged head 85 joined to the concave side 72 with a connecting member 96. In particular, the anchor 84 has an anchor end 86 that extends to a tapered anchor portion 88. A diameter of the tapered anchor portion 88 increases from the anchor end 86 until it meets with a cylindrical anchor portion 90. The cylindrical anchor portion 90 extends to an anchor edge 92 that meets with an anchor stop surface 94. The anchor stop surface 94 extends to an anchor connecting member 96. As shown in FIGS. 6 and 7, the anchor connecting member 96 is joined to the concave side 72 of the bracket 70 and has a diameter less than that of the cylindrical anchor portion 90. The anchor 84 and bracket 70 can be formed integral. In one of the preferred embodiments the bracket 70 and the anchor 84 are formed as a one piece unit. The brackets 70 are plastic and are made from acetal, polyamide, metals and combinations thereof and other suitable materials. As an alternative to the integrally molded anchor 84, the strip 50 can also be connected to the bracket 70 by means of screws, rivets or the like.

To join the strip 50 and a bracket 70, the strip opening 59 in the strip 50 is aligned with the anchor 84. The strip opening 59 widens as it is forced to stretch over the tapered anchor portion 88 and cylindrical anchor portion 90. After the strip 50 is moved past the anchor edge 92 it returns to its pre-stretched condition and surrounds the anchor connecting member 96. The strip 50 is thus joined to the bracket 70 and is prevented from sliding off the anchor 84 by the anchor stop surface 94. It is pointed out that the diameter of the strip opening 59 is equal to or greater than that of the anchor connecting member 96, but less than that of the cylindrical anchor portion 90, which advantageously prevents the strip 50 and bracket 70 from separating. Once the strips 50 and bracket 70 are joined, the concave side 72 of the bracket 70 advantageously contains the strip 50 such that the strip 50 is forced to bend in a curved path along the bracket 70, such that the strip 50 cannot become misaligned or move off the modules 22 as the strip 50 repeatedly compresses and expands as it moves about the sprocket 60, as shown in FIG. 8.

As shown in FIG. 7, the bracket 70 is joined to the modular belt 20 with at least one post or stud commonly designated 100 that extends from the stud side 80 and is formed integral with the bracket 70. In the embodiment shown in FIG. 7 there are two such studs 100. The bracket 70 and studs 100 can be formed as a one piece unit. The studs 100 have stud ends 102 that are opposite the elevated side 82 of the bracket 70. Each of the studs 100 has a first stud portion 104 that extends to the first contact surface 106. The first contact surface 106 extends from the first stud portion 104 to a stud edge 108. A tapered stud portion 110 extends from the stud edge 108 to the stud end 102. The diameter of the tapered stud portion 110 decreases as is approaches the stud end 102, as shown in FIG. 7. In other embodiments of the bracket there can be at least one stud 100, for example there can be one stud 100 or more than two studs 100.

Figure 9:
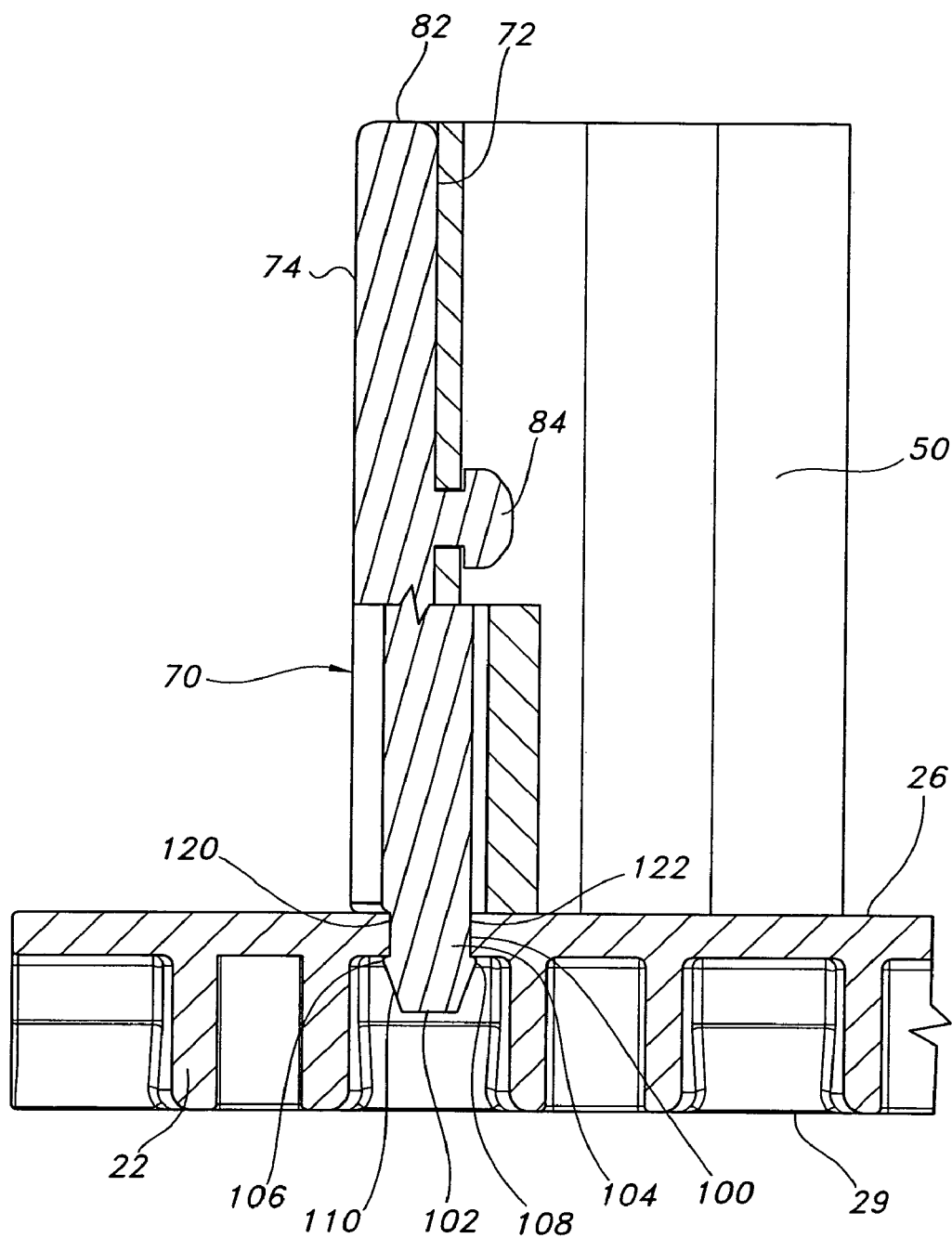
FIG. 9 is a sectional view of the bracket joined to the module with a stud.

As shown in FIG. 9, the module 22 has stud openings or bores 120 for receiving the studs 100. The stud openings 120 extend through each module 22 from the load side 26 to the opposed elevated base side 29. For a belt formed of rows of single modules, the stud openings 120 are formed proximal each of the opposed outer first and second sides 30, 32, respectively, of the module 22 such that modular belt 20 has spaced apart strips 50 and brackets 70, as shown in FIG. 1. Alternatively, the stud openings 120 would only be formed in the edge modules for a belt comprised of rows of multiple modules. The stud opening 120 is defined by a surrounded wall 122 that is sized to receive the first stud portion 104 therein, and has a diameter less than an outer diameter of the first contact surface 106 of the stud 100. The stud 106 is forcibly pressed into the stud opening 120 until the first stub portion 104 is positioned in the bore 120 and the first contact surface 106 abuts the elevated base side 29. Thus, the studs 106 are snapped into the module 22 and the bracket 70 is thereafter advantageously joined to the module 22. It is pointed out that the bracket 70 cannot move in a direction away from the module belt 20 because of the first contact surface 106 of the stud 100, and the bracket 70 cannot be forced deeper into the module 22, because the stud side 80 of the bracket 70 abuts the module 22. Thus, the bracket 70 is locked in place. Alternatively, the stud 100 may be slotted at the end to improve the spring function for securing the stud 100 to the module 22. In other embodiments, the brackets can be screwed, welded, or glued to the modules 20. Also, the bracket 70 may be integrally molded with the module 22.

As shown in FIG. 8, the width dimension W limits the maximum angle β between adjacent modules 22 when the modules 22 are moved over the sprocket 60.

Figure 9A:
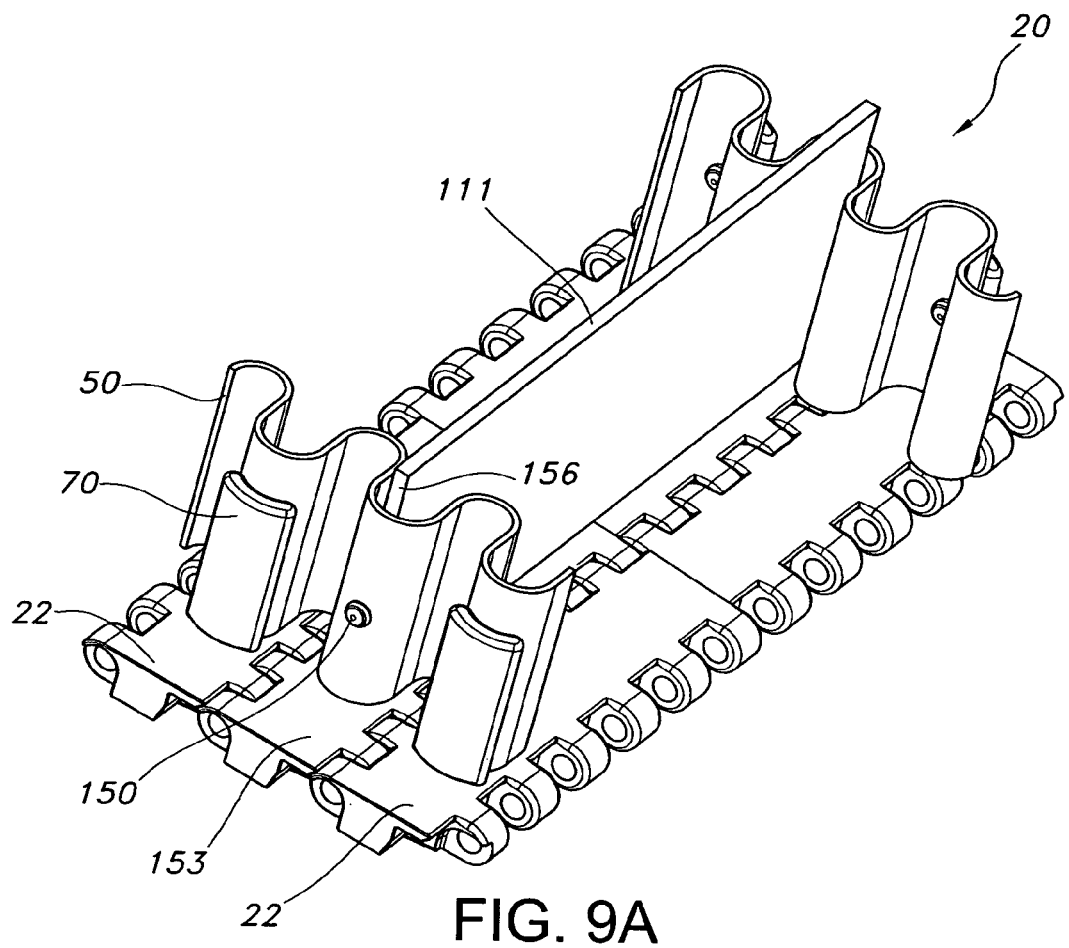
FIG. 9A is a perspective view of a section of a modular belt having a flight module and a gapless side guard.
Figure 9B:
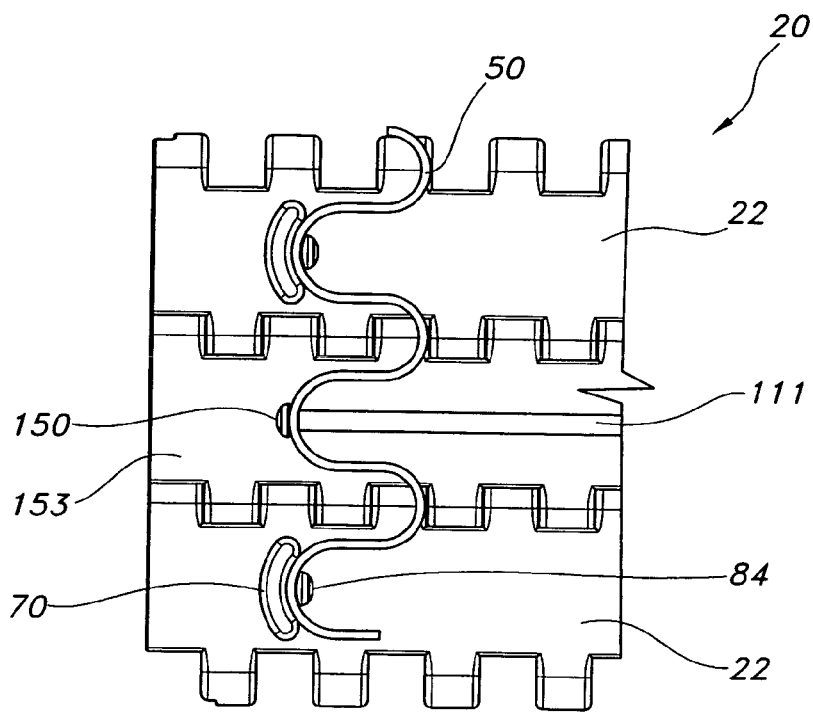
FIG. 9B is a top plan view of a section of a modular belt having a flight module and a gapless side guard
Figure 9C:
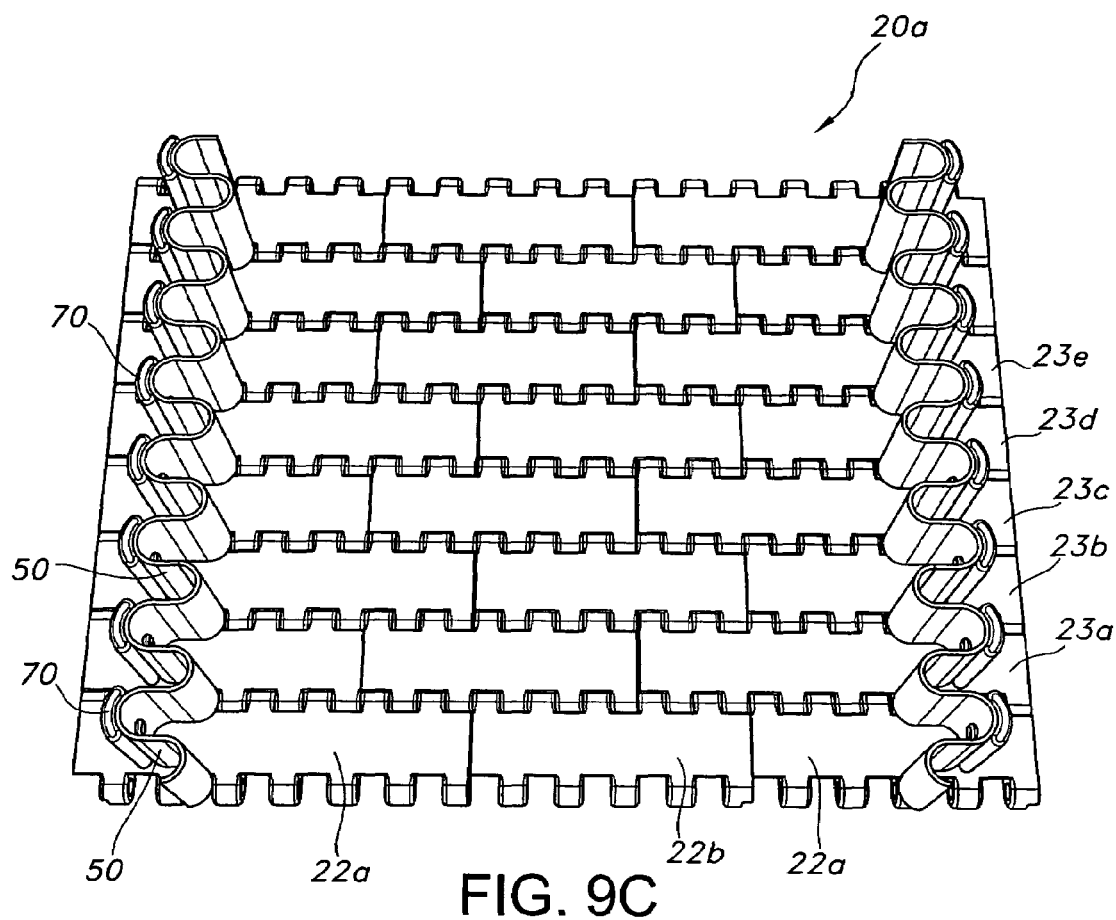
FIG. 9C is a perspective view of a bricklayed belt according to the present invention.
Figure 9D:
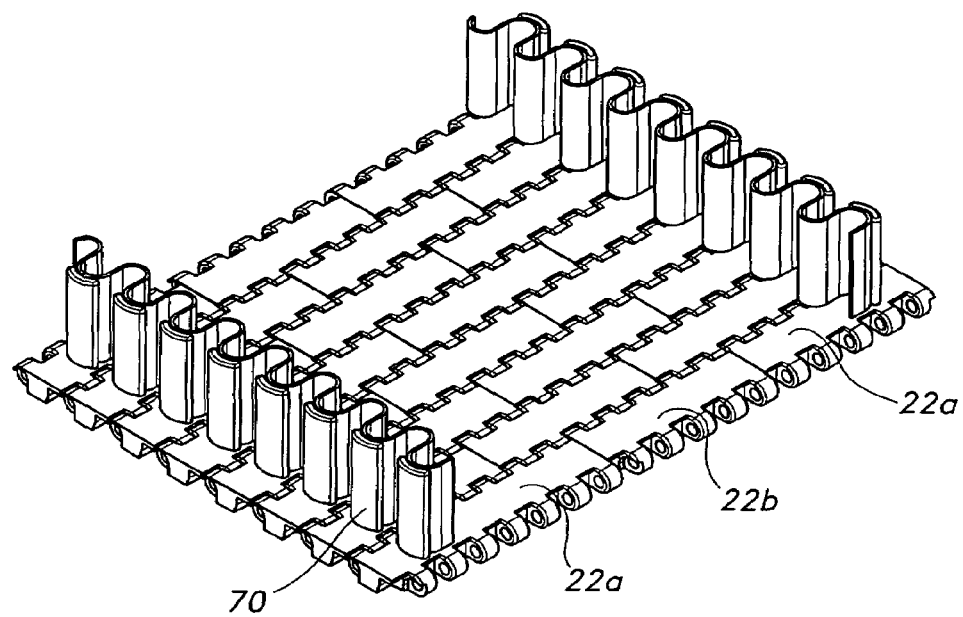
FIG. 9D is another perspective view of a bricklayed belt according to the present invention.

The gapless side guard 25 can be used on modular belts 20 that have flights 111, as shown in FIG. 9A-9B. Flights 111 are well known to those having ordinary skill in the art and the installation of flights 111 on modular belts 20 is well known to those having ordinary skill in the art. The flights 111 can be furnished with anchors 150 that are formed identically to the anchors 84 on the brackets 70. Accordingly, the bracket 70 may be omitted from this flight module 153. Instead, the strip 50 can be fixed to the flight 111 in close proximity and in contact with the flight edge 156. As shown the anchor 150 on the flight module 153 is disposed on the opposite side from the anchors 84 on brackets 70.

Figure 9E:
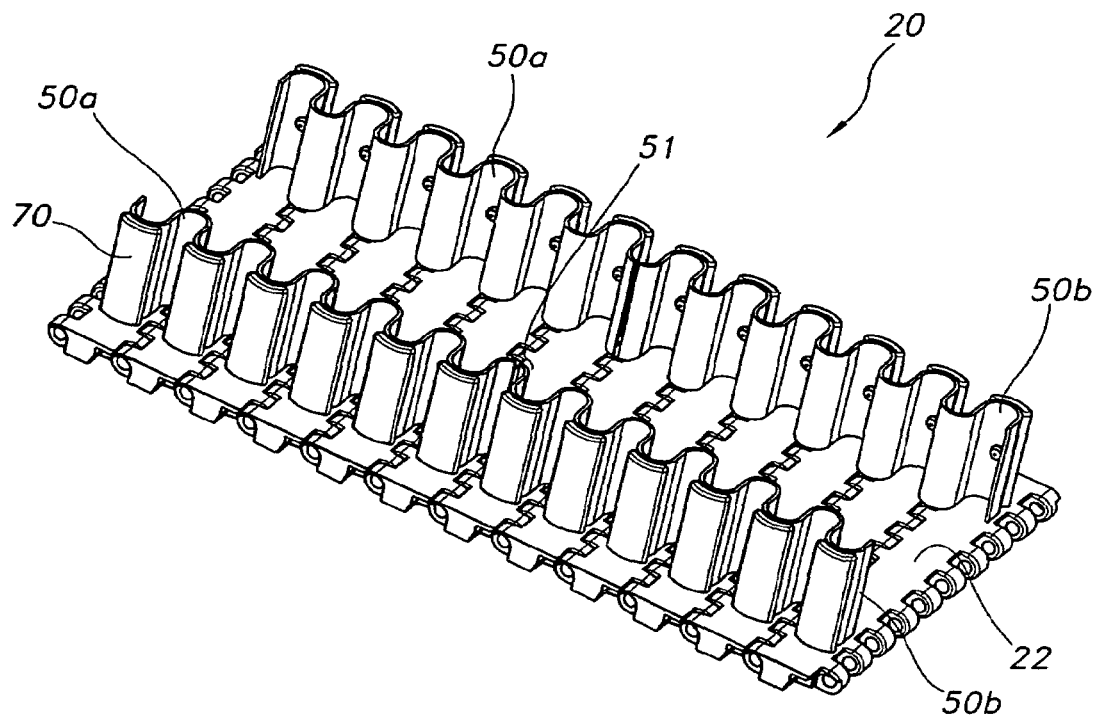
FIG. 9E is a perspective view of an alternate embodiment of the side guard of the present invention.
Figure 9F:
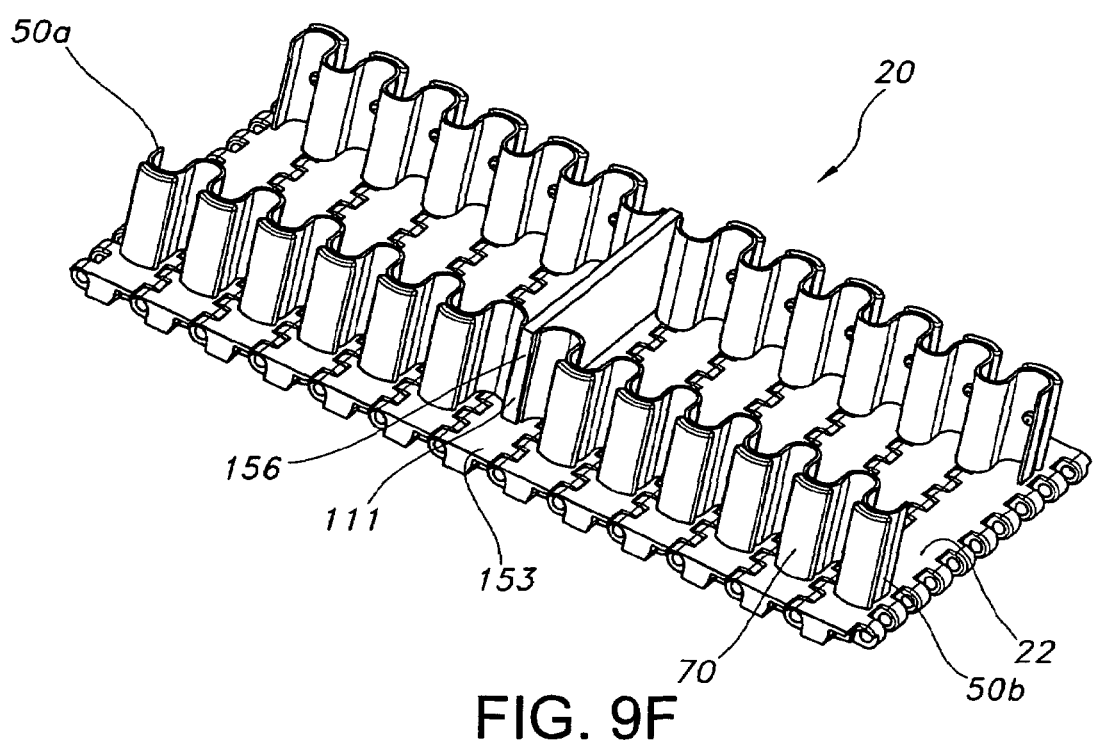
FIG. 9F is a perspective view of an another alternate embodiment of the present invention.

Turning to FIG. 9E, an alternate embodiment of the present invention is shown. The strip 50 is divided into two strips 50*a* and 50*b* with a gap 51 disposed therebetween. Although it is shown with a single gap 51, there could be more gaps 51 but the strip 50 is continuous for the width of at least two modules. The brackets 70 are installed in the modules 22 as described above. In FIG. 9F, the belt 20 includes a flight module 153 that is positioned such that the flight edge 156 fills the gap 51 between adjacent strips 50*a* and 50*b*.

Figure 10:
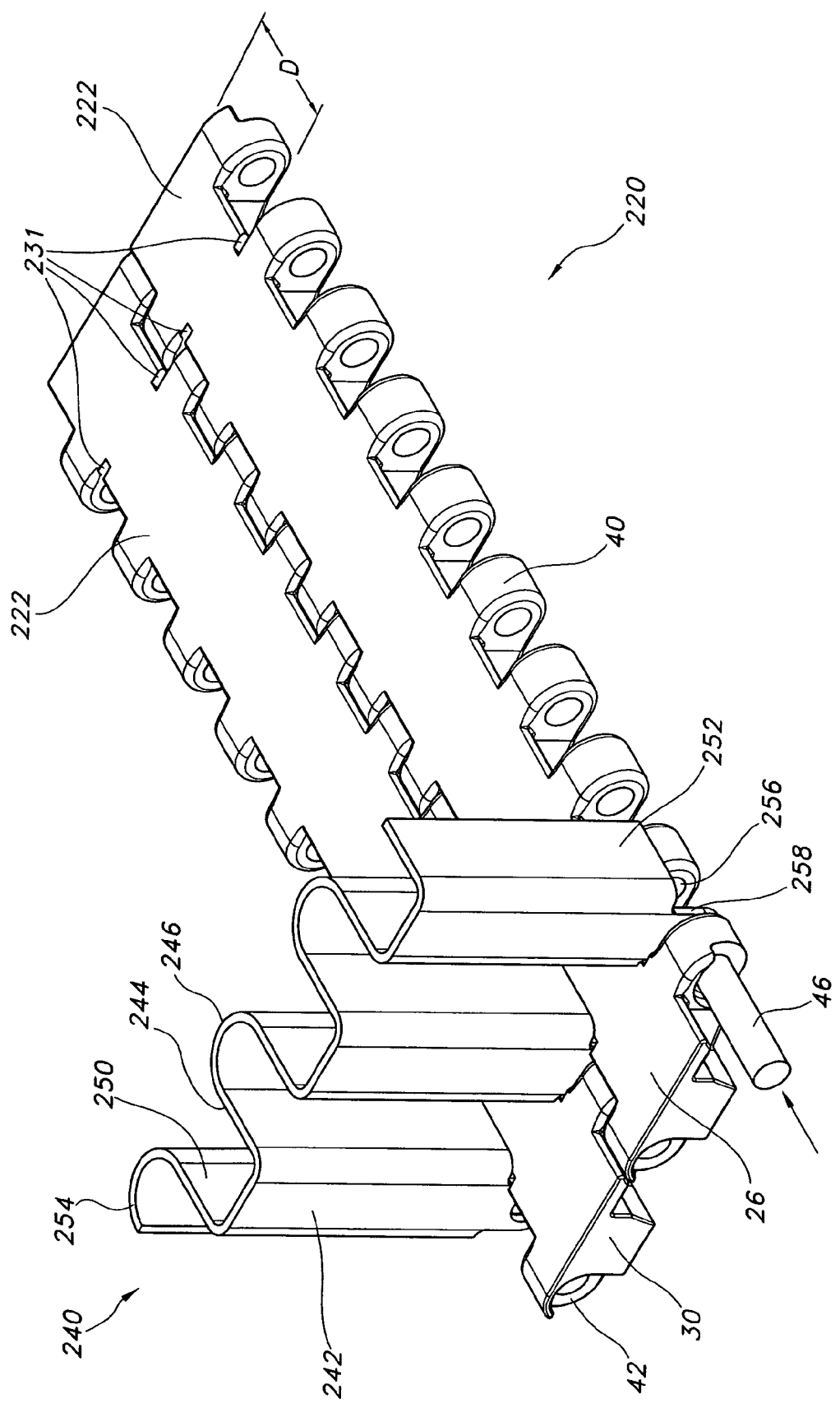
FIG. 10 is a perspective view of a second embodiment of the gapless side guard installed in a modular belt.
Figure 11:
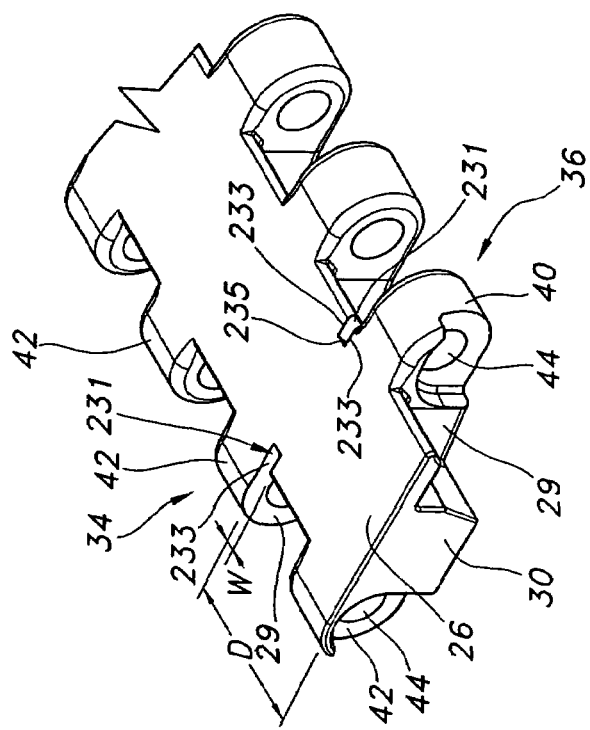
FIG. 11 is a perspective view of a module of the second embodiment.

FIGS. 10-14 show a second embodiment of a gapless side guard 218 that has a hooked strip 240. The second embodiment is described in connection with a belt having rows formed by single modules. However, it is to be understood that each row may be formed of multiple modules with structure for the side guard disposed on the outermost modules or edge modules of each row. In particular, the modular belt 220 comprises modules 222 and the modules 222 comprise plastic or other suitable material. Each of the modules 222 has a load side 26 and an opposed base side 28, an elevated base side 29, opposed outer first and second sides 30, 32, respectively, that extend from the load side 26 to the base side 28, as shown in FIG. 11. Each of the modules 222 has first and second link ends 34, 36, respectively, having offset first and second links 40, 42, respectively, with each having an opening commonly designated 44. As shown in FIG. 11, the load side 26 of each module 222 has a slot 231 (also referred to herein as recess) immediately after a first link 40 that is most proximal the outer first side 30 of the module 222, and an opposed slot 231 (also referred to herein as recess) immediately before the second link 42. The slots 231 have a width designated W in FIG. 11. The slots 231 extend from the load side 26, through the module 222 and to the opposed elevated base side 29. Each slot 231 is defined by a pair of spaced apart slot side walls 233 that extend to a slot end wall 235, as shown in FIG. 11. As shown in FIG. 11, the slots 231 are positioned an equal distance, designated D in FIG. 11, from the outer first side 30 of the module 222. In addition, the load side 26 of each module 222 has a slot 231 immediately before the second link 42 that is most proximal the outer second side 32 of the module 222, and a slot 231 that is disposed after the first link 40, as shown in FIG. 10. Each of these slots 231 is similarly positioned a distance D from the second side 32 of the module 222 and extend from the load side 26, through the module 222 and to the opposed elevated base side 29, as shown in FIG. 10. It is pointed out that in other embodiments the slots 231 can be made in the modules 222 at any desired distance from the first and second outer sides 30, 32, respectively, that is, the distance D can be varied as desired.

Figure 12:
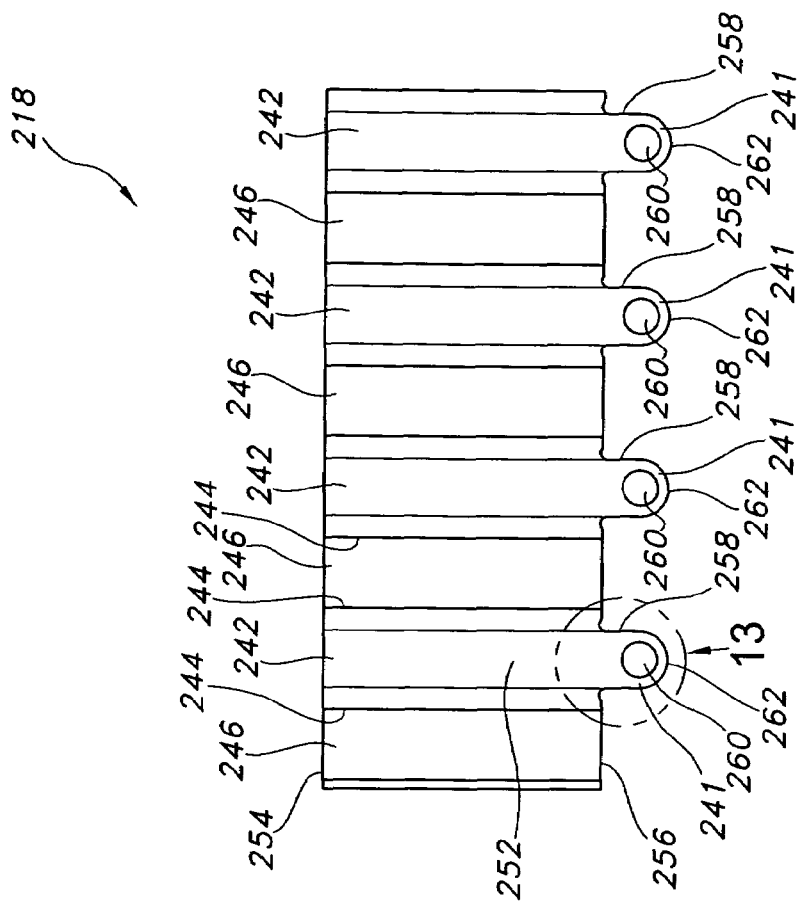
FIG. 12 is a front elevational view of the second embodiment of the gapless side guard.
Figure 13:
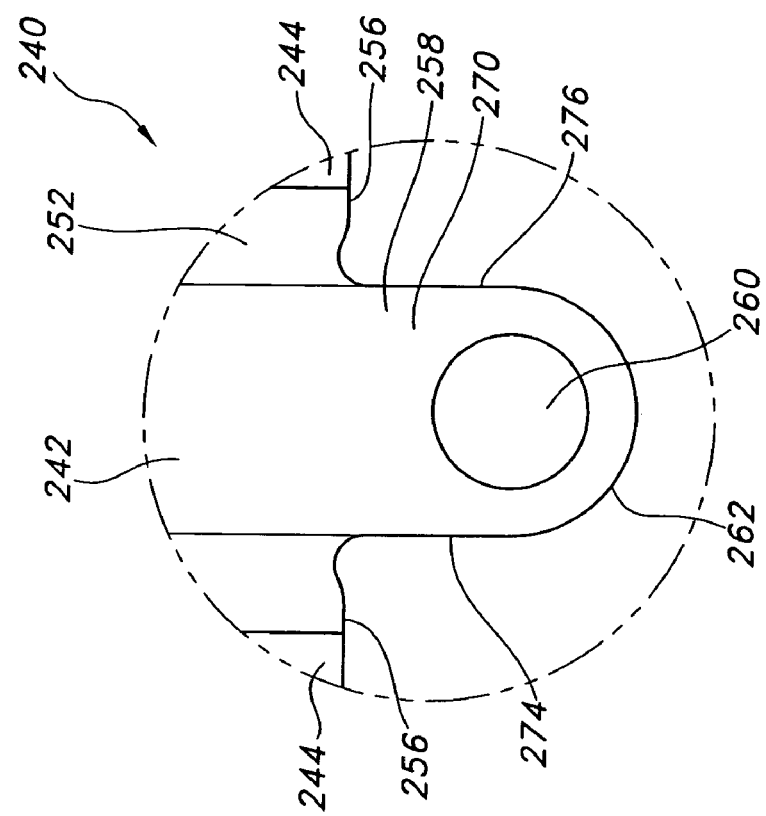
FIG. 13 is an enlarged front elevational view of a portion of the gapless side guard of the second embodiment.

As shown in FIGS. 10 and 12-13, there is a hooked strip 240 that is connected to the modular belt 220 with a pivot rod 46. The hooked strip 240 has a wave-like cross section and includes first portions 242 that extend to curved portions 244, and the curved portions 244 have crest portions 246. The hooked strip 240 also has opposed inner and outer hooked strip sides 250, 252, respectively, an upper wall 254 and an opposed base 256 as shown in FIG. 10.

Figure 14:
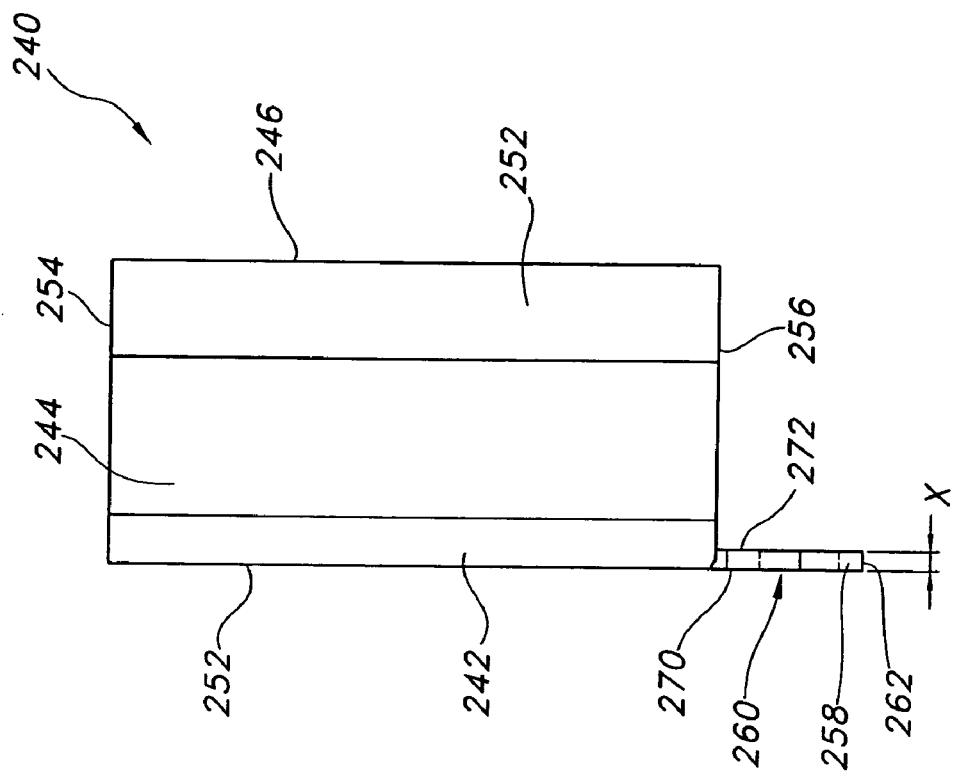
FIG. 14 is a right side elevational view of the gapless side guard of the second embodiment.

Extending from the base 256 is a connecting member 258 having a connecting member opening 260 or recess. The connecting member 258 and base 256 are preferably formed as a one piece unit. The connecting member 258 can also be integrally formed with the base 256. The connecting member 258 has a distal end 262 that is opposite the upper wall 254. The connecting member 258 also has opposed first and second connecting member surfaces 270, 272, respectively, as shown in FIG. 14. The first connecting member surface 270 and the outer hook strip side 252 are coplanar along the first portion 242 of the hooked strip 240, as shown in FIG. 14. In other embodiments they do not need to be coplanar, for example the connecting member 258 could be offset. In addition, as shown in FIG. 13, the connecting member 258 has opposed first and second connecting member ends 274, 276, respectively, and the connecting member 258 has a width designated X in FIG. 14. The width designated X of the connecting member 258 is less than the width designated W of the slot 231, such that the connecting member 258 can be positioned in the slot 231.

The modules 222 are connected by aligning adjacent modules 222 and moving them together to intercalate the first link ends 34 and the second link ends 36 such that the openings 44 in each align with one another. The hooked strip 240 is aligned with the modules 222 such that the connecting members 258 align with the slots 231 in adjacent modules 222. The connecting members 258 are then positioned in the slots 231 such that the first connecting member end 274 is proximal the slot end wall 235, and the second connecting member end 276 is proximal the slot end wall 235 of the adjacent module 222 and the connecting member opening 260 aligns with the openings 44 in the first and second links 40, 42, respectively. The pivot rod 46 is then moved into the aligned connecting member openings 260 and openings 44 and a head is formed on the pivot rod 46 such that it is held in place. In use, the hooked strip 240 holds product being transported on the modular belt 220. In addition, the hooked strip 240 elongates when the modular belt 220 is driven over a sprocket in the manner described in connection with the first embodiment.

Figure 15:
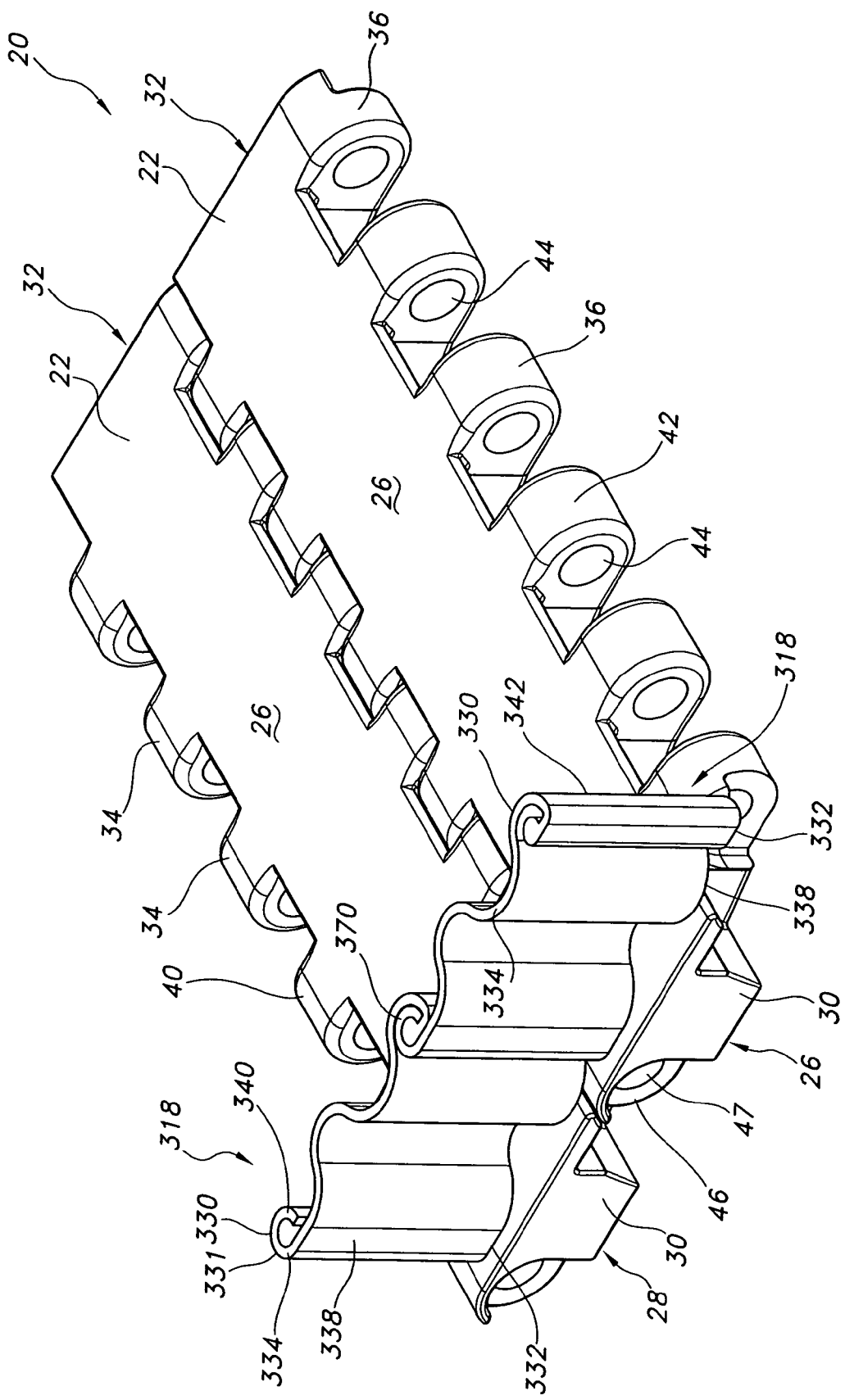
FIG. 15 is a perspective view of a third embodiment of a gapless side guard.
Figure 16:
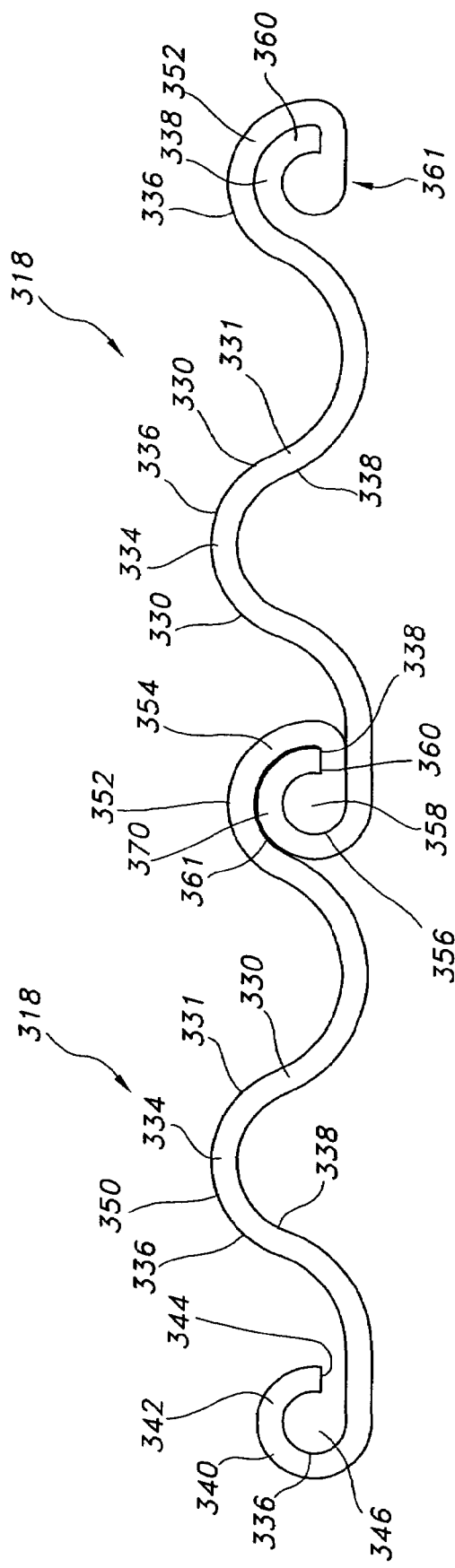
FIG. 16 is a top plan view of the third embodiment of the gapless side guard.

A third embodiment of a gapless side guard 318 is shown in FIGS. 15 and 16. This embodiment is also described in connection with a belt formed by rows of single modules. It is to be understood that this embodiment of the side guard may also be used in connection with a belt constructed of rows of multiple modules. The outermost or edge modules on opposite sides of the belt would be provided with the structure for the side guard. As described in connection with the first embodiment, the modular belt 20 has modules 22 each having opposed load and base sides, 26, 28, respectively, an elevated base side 29, and opposed outer first and second side sides 30, 32, respectively, that extend from the load side 26 to the base side 28. Each of the modules 22 has first and second link ends 34, 36, respectively, having offset first and second links 40, 42, respectively, with each having an opening commonly designated 44. The modules 22a are connected by intercalating the first link ends 34 and the second link ends 36 such that the openings 44 in each align, and positioning a pivot rod 46 in the aligned openings 44.

The gapless side guard 318 has guard members commonly designated 330 having bodies 331. A guard member 330 is molded to the load side 26 of the module 22 proximal each of the opposed outer first and second sides 30, 32, respectively, of the module 22, such that two spaced apart guard members 330 extend from the load side 26 of each module 22. The guard member 330 is molded to the load side 26 by, for example, co-molding. The guard members 330 comprise rubber or other suitable flexible material. The shape of the guard member 330 allows it to be snapped or linked with adjacent guard members 330 that extend from adjacent modules 22.

As shown in FIGS. 15 and 16 the guard member 330 extends from the load side 26 and has a guard member upper end 334, an inner guard wall 336 and an opposed outer guard wall 338. The guard members extend from the module 22 proximal the outer first and second side sides 30, 32, respectively. As shown in FIG. 16, each guard member 330 has a generally wave shape. The guard member 330 has a first interlock portion 340 disposed at one end thereof and a second interlock portion 352 disposed at the other end thereof. The first guard member 342 has an insertion portion 342 extends to an insertion portion end 344. The first interlock portion 340 surrounds a first recess 346 that extends from the guard member base 332 shown in FIG. 14 to the guard member upper end 334. It is pointed out that the inner guard wall 336 is curved in on and faces itself at the first interlocking portion 340. The first interlock portion 340 extends to a wave portion 350 and the wave portion 350 extends to a second interlock portion 352.

The second interlock portion 352 includes a receiving portion 354 having a receiving portion end 356. A protrusion 358 extends from the receiving portion 354 proximal the receiving portion end 356 as shown in FIG. 16. A receiving gap 360 extends from the guard member base 332 to the guard member upper end 334, and the gap 360 is defined where the outer guard wall 338 is curved in upon itself at reference number 361. The receiving gap 360 is sized to accommodate and receive the first interlock portion 340 of an adjacent module 22, as shown in FIGS. 15 and 16. It is pointed out that the outer guard wall 338 is curved in on and faces itself at the second interlock portion 352.

To interconnect the first and second interlock portions 340, 352, respectively, the first interlock portion 340 of one module 22 is aligned with the second interlock portion 352 of an adjacent module 22, such that the insertion portion 342 of the first interlock portion 340 is positioned adjacent the receiving portion 354 of the second interlock portion 352. The adjacent modules 22 are moved together such that the insertion portion 342 of one module 22 is slid or introduced into the receiving gap 360 of the second interlock portion 352 of the adjacent module 22. Insertion or introduction continues until the offset first and second links 40, 42, respectively, are received in one another and the openings 44 in each align. The mated first and second interlock portions 340, 352, respectively, form an interlock 370 that joins the first and second interlock portions 340, 352, respectively, of adjacent modules 22 together. It is to be understood that the same interlocking process is being carried out on the opposite side of the module 22, such that the first interlock portions 340 of one module 22 are interlocked with the second interlock portions 352 of the adjacent module 22 at the same time. A pivot rod 46 is introduced into the aligned openings 44. It is pointed out that after the pivot rod 46 has been installed, the insertion portion 342 abuts against the protrusion 358 thus interlocking the first and second interlock portions 340, 342, respectively, of adjacent guard members 330 together as shown in FIG. 16.

When the first and second interlock portions 340, 352, respectively, are interlocked in the manner described above, the modular belt 20 can be driven over a sprocket or drum without the first and second interlock portions 340, 352, respectively, separating, because separation is prevented by the interlock 370. In other embodiments, adjacent guard members are joined by adhesives, such as glue, or they are joined by a vulcanizing process. The vulcanizing process is well known to those having ordinary skill in the art.

It is to be understood that the gapless side guard described in connection with the second and third embodiments can be used with flights 111, as described in connection with the first embodiment.

It will be appreciated by those skilled in the art that while a gapless side guard invention has been described above in connection with particular embodiments and examples, the invention is not necessarily so limited, and other embodiments, examples, uses, and modifications and departures from the described embodiments, examples, and uses may be made without departing from the gapless side guard of this invention. All of these embodiments are intended to be within the scope and spirit of the present gapless side guard invention.

What is claimed is:

1. A modular belt, comprising:
   a plurality of modules having a top surface, an intermediate section, a first plurality of link ends extending from the intermediate section in a first direction, a second plurality of link ends extending in a second direction opposite the first direction, the first and second plurality of link ends having transverse pivot rod openings defined therein, the first and second link ends being offset such that the first link ends are capable of being intercalated with the second link ends of an adjacent module when the modules are assembled to form the belt, the modules having a length oriented in a direction transverse to a direction of belt travel and having a width disposed along the direction of belt travel;
   at least one continuous strip extending upward from the support surface along a side edge of the belt to form a side guard, the continuous strip extending across the width of at least two belt modules, wherein the at least one continuous strip extends along the entire belt.

2. The modular belt of claim 1, further comprising:
   at least one bracket extending from the top surface and supporting the strip.

3. The modular belt of claim 1, wherein the strip has at least one extension with an opening defined therein for receiving a pivot rod.

4. The modular belt of claim 2 wherein the strip comprises flexible plastic.

5. The modular belt of claim 2 wherein the strip has an inner strip wall, and an opposed outer strip wall, and opposed first and second strip ends and the first strip end abuts against the module such that materials transported on the modular belt are retained on the modular belt by the strip.

6. The modular belt of claim 1, further comprising:
   a flight module having a flight with a flight edge disposed adjacent to the strip.

7. A modular belt, comprising:
   a plurality of modules having a top surface, an intermediate section, a first plurality of link ends extending from the intermediate section in a first direction, a second plurality of link ends extending in a second direction opposite the first direction, the first and second plurality of link ends having transverse pivot rod openings defined therein, the first and second link ends being offset such that the first link ends are capable of being intercalated with the second link ends of an adjacent module when the modules are assembled to form the belt, the modules having a length oriented in a direction transverse to a direction of belt travel and having a width disposed along the direction of belt travel;
   at least one continuous strip extending upward from the support surface along a side edge of the belt to form a side guard, the continuous strip extending across the width of at least two belt modules, wherein the strip has at least one extension with an opening defined therein for receiving a pivot rod, wherein at least one of the plurality of modules has a slot defined therein for receiving the at least one extension therethrough such that the strip can be supported above the support surface by connection to at least one pivot rod.

8. A modular belt, comprising:
   a plurality of modules having a top surface, an intermediate section, a first plurality of link ends extending from the intermediate section in a first direction, a second plurality of link ends extending in a second direction opposite the first direction, the first and second plurality of link ends having transverse pivot rod openings defined therein, the first and second link ends being offset such that the first link ends are capable of being intercalated with the second link ends of an adjacent module when the modules are assembled to form the belt, the modules having a length oriented in a direction transverse to a direction of belt travel and having a width disposed along the direction of belt travel;
   at least one continuous strip extending upward from the support surface along a side edge of the belt to form a side guard, the continuous strip extending across the width of at least two belt modules, wherein the strip comprises a flexible material and is capable of flexing between relaxed and extended conditions and when in the relaxed condition the strip has a wave shaped cross section and when in the extended condition the strip elongates such that it is capable of being driven over a sprocket.

9. A modular belt, comprising:
   a plurality of modules having a top surface, an intermediate section, a first plurality of link ends extending from the intermediate section in a first direction, a second plurality of link ends extending in a second direction opposite the first direction, the first and second plurality of link ends having transverse pivot rod openings defined therein, the first and second link ends being offset such that the first link ends are capable of being intercalated with the second link ends of an adjacent module when the modules are assembled to form the belt, the modules having a length oriented in a direction transverse to a direction of belt travel and having a width disposed along the direction of belt travel;
   at least one continuous strip extending upward from the support surface along a side edge of the belt to form a side guard, the continuous strip extending across the width of at least two belt modules, wherein the strip has a wave shaped cross section when in a relaxed condition and the strip has a first crest portion that joins with a second crest portion and wherein the second crest portions are joined to the bracket.

10. A modular belt, comprising:
    a plurality of modules having a top surface, an intermediate section, a first plurality of link ends extending from the intermediate section in a first direction, a second plurality of link ends extending in a second direction opposite the first direction, the first and second plurality of link ends having transverse pivot rod openings defined therein, the first and second link ends being offset such that the first link ends are capable of being intercalated with the second link ends of an adjacent module when the modules are assembled to form the belt, the modules having a length oriented in a direction transverse to a direction of belt travel and having a width disposed along the direction of belt travel;
    at least one continuous strip extending upward from the support surface along a side edge of the belt to form a side guard, the continuous strip extending across the width of at least two belt modules;
    at least one bracket extending from the top surface and supporting the strip;
    wherein at least one anchor extends from the bracket and the anchor is for joining the strip to the bracket.

11. The modular belt of claim 10 wherein the bracket has a concave side and the anchor has an anchor connecting member that extends from the concave side to an anchor stop surface and wherein the strip has a strip opening and when the anchor and strip are joined the strip opening surrounds the anchor stop surface and the strip abuts the anchor stop surface.

12. A modular belt, comprising:
a plurality of modules having a top surface, an intermediate section, a first plurality of link ends extending from the intermediate section in a first direction, a second plurality of link ends extending in a second direction opposite the first direction, the first and second plurality of link ends having transverse pivot rod openings defined therein, the first and second link ends being offset such that the first link ends are capable of being intercalated with the second link ends of an adjacent module when the modules are assembled to form the belt, the modules having a length oriented in a direction transverse to a direction of belt travel and having a width disposed along the direction of belt travel;
at least one continuous strip extending upward from the support surface along a side edge of the belt to form a side guard, the continuous strip extending across the width of at least two belt modules;
at least one bracket extending from the top surface and supporting the strip;
wherein the bracket has opposed first and second edges and opposed elevated and stud sides and wherein studs extends from the stud side and each of the studs has a first contact surface.

13. A modular belt, comprising:
a plurality of modules having a top surface, an intermediate section, a first plurality of link ends extending from the intermediate section in a first direction, a second plurality of link ends extending in a second direction opposite the first direction, the first and second plurality of link ends having transverse pivot rod openings defined therein, the first and second link ends being offset such that the first link ends are capable of being intercalated with the second link ends of an adjacent module when the modules are assembled to form the belt, the modules having a length oriented in a direction transverse to a direction of belt travel and having a width disposed along the direction of belt travel;
at least one continuous strip extending upward from the support surface along a side edge of the belt to form a side guard, the continuous strip extending across the width of at least two belt modules;
at least one bracket extending from the top surface and supporting the strip;
wherein the bracket is integrally molded to the belt module.

14. (The modular belt of claim 13, where the module has stud openings that extend from a load side of the module and through the module to an opposed elevated base side and wherein the stud opening is surrounded by a surrounding wall.

15. The modular belt of claim 14, wherein the surrounding wall has a diameter less than that of the first contact surface of the studs such that after the studs have been pressed into the stud openings the first contact surfaces of the studs abut against the elevated base wall and the stud side of the bracket abuts against the load side of the module such the bracket is joined to the module.

16. A modular belt, comprising:
a plurality of modules having a top surface, an intermediate section, a first plurality of link ends extending from the intermediate section in a first direction, a second plurality of link ends extending in a second direction opposite the first direction, the first and second plurality of link ends having transverse pivot rod openings defined therein, the first and second link ends being offset such that the first link ends are capable of being intercalated with the second link ends of an adjacent module when the modules are assembled to form the belt, the modules having a length oriented in a direction transverse to a direction of belt travel and having a width disposed along the direction of belt travel;
at least one continuous strip extending upward from the support surface along a side edge of the belt to form a side guard, the continuous strip extending across the width of at least two belt modules;
a flight module having a flight with a flight edge disposed adjacent to the strip;
wherein the flight edge has an anchor disposed thereon for attaching the strip to the flight edge.

17. A method for making a gapless side guard comprising:
providing a modular belt having modules each having a base side and an opposed load side, an elevated base side opposite the load side, opposed outer first and second outer sides, and opposed first and second links having openings,
forming slots in the module and extending the slots through the elevated base,
providing a hooked strip having an extension and defining an extension opening, and
positioning the extension in the slots and connecting the hooked strip to the modular belt with a pivot rod that extends through the openings and the extension opening.

* * * * *

UNITED STATES PATENT AND TRADEMARK OFFICE
CERTIFICATE OF CORRECTION

PATENT NO. : 7,556,145 B2 Page 1 of 1
APPLICATION NO. : 11/635991
DATED : July 7, 2009
INVENTOR(S) : Elsner It is certified that error appears in the above-identified patent and that said Letters Patent is hereby corrected as shown below:

Col. 9, line 31, Claim 4, "claim 2" should read --claim 1,--; and

Col. 9, line 33, Claim 5, "claim 2" should read --claim 1,--.

Signed and Sealed this

Eighteenth Day of August, 2009

David J. Kappos
*Director of the United States Patent and Trademark Office*